United States Patent [19]
Bresnick

[11] 3,804,710
[45] Apr. 16, 1974

[54] NUCLEAR REACTOR FUEL ELEMENT
[75] Inventor: Stuart D. Bresnick, West Nyack, N.Y.
[73] Assignee: United Nuclear Corporation, Elmsford, N.Y.
[22] Filed: Dec. 9, 1970
[21] Appl. No.: 96,425

[52] U.S. Cl. .................................. 176/79, 176/68
[51] Int. Cl. ............................................. G21c 3/10
[58] Field of Search .................... 176/68, 79, 81, 73

[56] References Cited
UNITED STATES PATENTS

| | | | |
|---|---|---|---|
| 3,141,830 | 7/1964 | Klepfer et al. | 176/68 |
| 3,180,804 | 4/1965 | Flora et al. | 176/79 |
| 3,225,437 | 12/1965 | Stohr et al. | 176/79 X |
| 3,238,108 | 3/1966 | Deddens et al. | 176/68 |
| 3,365,372 | 1/1968 | Swanson et al. | 176/68 |
| 3,378,458 | 4/1968 | Ross et al. | 176/79 |
| 3,466,226 | 9/1969 | Lass et al. | 176/79 X |

Primary Examiner—Carl D. Quarforth
Assistant Examiner—Gary G. Solyst
Attorney, Agent, or Firm—Pennie & Edmonds

[57] ABSTRACT

A tubular fuel element having end plugs welded to each end with reproducible high quality welds. The tube contains fissionable fuel in any form but advantageously in the form of pellets partially filling the tube leaving a void space at one end for the reception of the fission gases. A compression spring of nickel, or an alloy of nickel, is located within this space to hold the fuel pellets in position. The end plugs, made of a zirconium alloy, are each provided with a head portion for engaging the fuel at the bottom end and the spring at the top. The surface of the head is spaced a suitable distance from the welded joint at the end of the tube and the head is connected to the inner portion of the end plug by a narrow neck portion. This construction prevents excessive stresses in the weld and adjacent tubing during service, and at the top end prevents the heat of welding from inducing the formation of a brittle nickel-zirconium eutectic in the adjacent materials.

4 Claims, 3 Drawing Figures

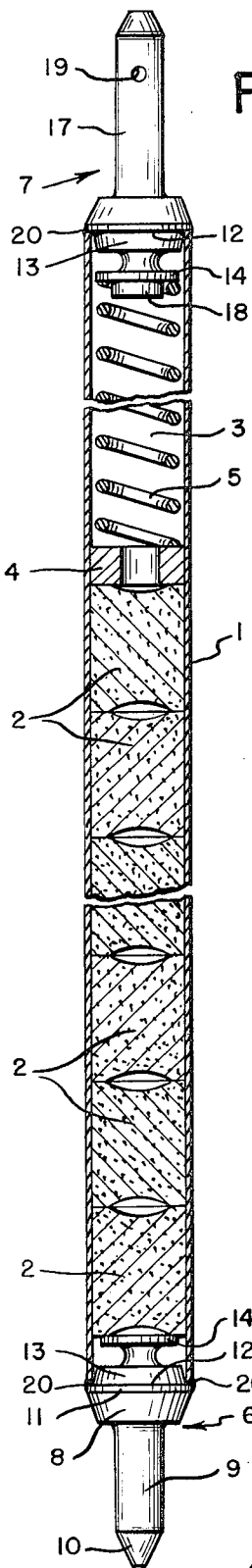
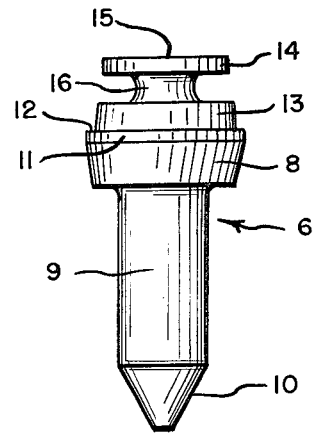
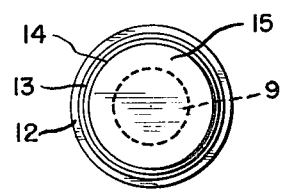
FIG. 1
FIG. 2
FIG. 3
INVENTOR
Stuart D. Bresnick
BY
ATTORNEYS

NUCLEAR REACTOR FUEL ELEMENT

BRIEF SUMMARY OF THE INVENTION

The fuel element of the present invention includes an end plug made of zirconium or a zirconium alloy, for example such as is sold under the trade name of Zircaloy, and welded to each end of the tubular cladding member. This end plug, generally speaking, is of standard or conventional form or construction, having a shoulder against which the end of the tubular cladding member is fitted and welded, and an inner tapered section adjacent this shoulder which extends into the tube and facilitates the making of a high quality weld. Inwardly of this tapered section, however, there is a head portion connected thereto by a neck portion which supports the head member at a sufficient distance from the shoulder (where the greatest temperature occurs during the welding operation) to cause a sufficient temperature gradient so that an undesirable temperature at the surface of the head portion is not reached. The surface of the head portion is flat so as to firmly engage the fuel pellet at the bottom of the tube and also to firmly engage the flat end of the helical spring at the top end of the fuel element. This spring is made of nickel or an alloy of nickel such as that available under the trade name Inconel.

The provision of this novel formation on the inner end of the end plug solves both the top and bottom end problems which have heretofore been encountered. At the bottom end it keeps the fuel a safe distance from the weld, thus reducing the temperature gradient to an acceptable level and avoiding unacceptable high stresses in the weld or in the cladding near the weld which could cause rupture in reactor service. At the top end it prevents the spring from reaching a temperature during welding which would cause eutectic formation and a reduction in the compressing force of the spring. This eutectic would be an alloy of the metal of the spring and of the end plug and weld material which would be of a nature to embrittle the cladding or the weld and possibly cause failure of the fuel element in service. It would also lower the corrosion resistance of the cladding and weld.

Attempts have been made heretofore to solve these problems in a number of different ways, such, for example, as by the use of a ceramic or other insulator, or by the use of a special spring design. Such a design is shown in U.S. Pat. No. 3,378,458, Ross and Venier, issued Apr. 16, 1968. According to this patent one or two turns at the end of the spring were turned 90° forming an end loop for contacting the end plug. The area of contact of the spring with the end of the end plug was thus substantially reduced. Also this end loop was coated with a material such as chromium which forms with the material of the end plug a eutectic mixture having a melting temperature higher than that of the eutectic mixture formed of the materials of the spring and end plug, and thus less likely to melt during welding. This proposal is objectionable because of the necessity of coating the end loop as described whereas the novel construction of the end plug according to the present invention accomplishes the desired result without the use of the coating material.

In addition no attempt is made by the above patentees to correct the objectionable situation at the opposite end of the fuel element where the fuel is in direct contact with the surface of the end plug close to the weld so that temperature gradients or pellet swelling during service would tend to produce high stresses in the weld itself or in the adjacent cladding material. These high stresses might cause failure during service in a reactor.

BRIEF DESCRIPTION OF THE DRAWINGS

FIG. 1 is a view of a fuel element showing the tubular cladding in central section and the bottom and top end plugs in elevation;

FIG. 2 is an enlarged elevational view of the bottom end plug, and

FIG. 3 is a top view of the end plug shown in FIG. 2.

DETAILED DESCRIPTION

Referring to FIG. 1, the nuclear fuel element comprises a tubular cladding member or tube 1, of the desired diameter and length. Within this tube are placed fuel pellets 2 which fill the tube from the bottom end up to a distance from the top end sufficient to provide a fission gas receiving chamber 3 of the required dimension. An insulator disk 4 is placed on the uppermost fuel pellet having an aperture therethrough for the passage of the fission gases. A helical spring 5 is located within chamber 3, its lower end resting on insulator disk 4 and its upper end reaching to the top of the fuel element.

Tube 1 is of stainless steel or zirconium alloy such as Zircaloy. Spring 5 is of nickel or of a nickel alloy such as Inconel. At the bottom of tube 1 is a bottom end plug 6 and at the top there is another end plug 7. Both of these end plugs are of zirconium or of Zircaloy, or other alloy of zirconium.

Referring now to FIG. 2 which shows the bottom end plug 6 in detail the end plug has a body portion 8 from which a shank portion 9 projects, the lower end of this shank portion having a tapered end 10 to facilitate assembly of the fuel element in the reactor.

At the inner rim of body portion 8 there is a narrow circular collar 11 and a shoulder 12 is formed around the upper edge of this collar and serves to interconnect collar 11 with an inner tapered section 13. The formation of the end plug to this point is conventional. The novel feature of the end plug is the head portion 14 having a flat upper surface 15 of sufficient diameter to cooperate with the bottom pellet at the bottom of tube 1 and with the top end of spring 5 at the top of the tube. Head portion 14 is spaced from the inner tapered section 13 a predetermined distance and is supported in this position by a neck portion 16 of reduced diameter.

The top end plug 7 is like the bottom end plug 6 as just described except that its shank 17 is somewhat longer than shank 9 of the lower end plug, and the head portion 14 of the top end plug has a central cylindrical projection 18 to facilitate centering spring 5 with respect to the head portion.

Returning to FIG. 1 the bottom fuel pellet 2 rests upon the flat surface of the head portion 14 of the bottom end plug 6, and the uppermost turn of spring 5 bears against the head portion 14 of the top end plug 7. It will be understood that when the fuel tube 1 is assembled in the reactor the shank 9 of the lower end plug 6 is inserted in an aperture in the bottom plate (not shown) of the reactor, and the shank 17 of the top end plug 7 is inserted in an aperture in the top grid of the reactor. The crosswise or lateral aperture 19 in the shank 17 of top end plug 7 is for the purpose of receiving the hook of a hoist by which the fuel element or rod is placed in position in the reactor.

When the end plugs are placed in position as above described the bottom end plug 6 is welded to the bottom end of tube 1 around the periphery of shoulder 12 as indicated at 20. The presence of the inner tapered section 13 extending a short distance within the end of tube 1 facilitates the making of a high quality weld, the weld metal extending from the end of the tube along a portion of the tapered surface of section 13 as well as between the end of the tube and shoulder 12. The top end plug 7 is welded at the top end of tube 1 in the same manner.

Because of the presence of the head member 14 on the bottom end plug 6 the lower surface of the lowest fuel pellet 2 is supported at a sufficient distance from the weld 20 to prevent temperature gradients or fuel pellet swelling during reactor service from producing unacceptable high stresses such as could cause rupture of the weld, or of the cladding near the weld. In other words, the provision of head portion 14 keeps the fuel pellet at a safe distance from the weld, reducing the temperature gradient to an acceptable level.

The provision of head member 14 on the top end plug 7 places the end of spring 5 at such a distance from the weld 20 as to prevent the spring, during welding, from reaching a temperature which would cause relaxation of the spring, or the formation of a eutectic which could lower the corrosion resistance of the cladding or of the weld, or embrittle the cladding or weld so as to cause failure in service.

I claim:

1. In a nuclear reactor fuel element including:
   a. a tubular cladding member having a body of fissionable fuel disposed therein,
   b. a chamber at one end of the tubular cladding member for receiving fission gases and,
   c. a compression coil spring composed principally of nickel disposed within said chamber between one end of the fuel body and the adjacent end of the tubular member, the improvement in combination therewith which comprises:
   d. end plugs at the opposite ends of said tubular cladding member, each of said plugs including:
      1. a body portion having a shoulder against which an end of the tubular cladding member is welded,
      2. an inner tapered section adjacent said shoulder for accepting part of the weld,
      3. a head member disposed inwardly from said tapered section having a flat outer surface to engage the contents of said tubular member and,
      4. a narrow neck portion interconnecting said head member and said inner tapered section causing the surface of said head member and the portion of said contents adjacent thereto to be located at a substantial distance from said weld.

2. A nuclear reactor fuel element according to claim 1 in which the flat outer end of the coil spring engages the inner surface of the head member of the adjacent end plug.

3. A nuclear reactor fuel element according to claim 2 in which the head member has an extension projecting from its inner surface to cooperate with at least one coil of the spring for centering the spring on the head member of the adjacent end plug.

4. A nuclear reactor fuel element according to claim 1 wherein the portion of fuel in the tubular cladding member nearest the end thereof opposite from the end containing the spring engages the flat surface of the head member of the adjacent end plug.

* * * * *